United States Patent
Yang et al.

(10) Patent No.: US 11,978,913 B2
(45) Date of Patent: May 7, 2024

(54) BATTERY POWER MANAGEMENT FOR A BATTERY BACKUP UNIT (BBU) SHELF

(71) Applicant: Baidu USA LLC, Sunnyvale, CA (US)

(72) Inventors: Huawei Yang, San Jose, CA (US); Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 919 days.

(21) Appl. No.: 16/863,917

(22) Filed: Apr. 30, 2020

(65) Prior Publication Data

US 2021/0343993 A1 Nov. 4, 2021

(51) Int. Cl.
| | |
|---|---|
| *H01M 50/20* | (2021.01) |
| *H01M 10/42* | (2006.01) |
| *H01M 10/48* | (2006.01) |
| *H01M 50/502* | (2021.01) |
| *H02J 7/00* | (2006.01) |

(52) U.S. Cl.
CPC ......... *H01M 50/20* (2021.01); *H01M 10/425* (2013.01); *H01M 10/482* (2013.01); *H01M 50/502* (2021.01); *H02J 7/0013* (2013.01); *H01M 2010/4271* (2013.01)

(58) Field of Classification Search
CPC .. H01M 50/20; H01M 50/502; H01M 10/425; H01M 10/482; H01M 2010/4271; H02J 7/0013

See application file for complete search history.

(56) References Cited

U.S. PATENT DOCUMENTS

| | | | |
|---|---|---|---|
| 2004/0126635 A1* | 7/2004 | Pearson | H01M 8/0488 429/430 |
| 2013/0193764 A1* | 8/2013 | Bailey | G06F 1/263 713/300 |
| 2013/0221926 A1* | 8/2013 | Furtner | H02J 7/0019 320/128 |
| 2015/0357865 A1* | 12/2015 | Bailey | G06F 1/263 307/66 |

(Continued)

FOREIGN PATENT DOCUMENTS

| | | | |
|---|---|---|---|
| JP | 02114828 | * | 10/1988 |
| KR | 129909 | * | 8/2013 |
| WO | WO 2011054012 | * | 5/2011 |

*Primary Examiner* — Alexander Usyatinsky
(74) *Attorney, Agent, or Firm* — WOMBLE BOND DICKINSON (US) LLP (57) ABSTRACT

According to one embodiment, a battery management system includes a BBU shelf with bus connectors; a battery module with battery cell packages, each package including battery cells; and a converter module having 1) a set of converters, 2) a first busbar to which each converter is connected, the first busbar includes several switches, each switch is disposed between adjacently connected converters, 3) a second busbar to which each converter is connected via a first switch and to which each package is connected via a second switch, the second busbar comprises several switches, each switch is disposed between adjacently connected converters, packages, or a combination thereof, and 4) a third busbar to which each converter is connected and to which each bus connector is connected via a third switch, the third busbar includes several switches, each switch is disposed between adjacently connected converters, bus connectors, or a combination thereof.

21 Claims, 5 Drawing Sheets

(56) References Cited

U.S. PATENT DOCUMENTS

2016/0094089 A1\* 3/2016 Bailey .................... G06F 1/263
　　　　　　　　　　　　　　　　　　　307/66
2016/0165744 A1\* 6/2016 Bailey ................. H05K 7/1492
　　　　　　　　　　　　　　　　　　　361/624

\* cited by examiner

BATTERY POWER MANAGEMENT FOR A BATTERY BACKUP UNIT (BBU) SHELF

FIELD

Embodiments of the present disclosure relate generally to battery power management for a battery backup unit (BBU) shelf.

BACKGROUND

Lithium-ion batteries are commonly used in the vehicle industry, for example, electric vehicles (EVs) and plug-in hybrids. Lithium-ion battery packs for electric vehicles are designed for vehicle specific requirements and usage. Lithium-ion batteries, however, are also becoming more popular for Information Technology (IT) equipment stored and operated in data centers as an energy storage unit that is replacing Uninterruptible Power Supply (UPS) systems.

Large clusters of computer servers can be kept in dedicated facilities, often in a rack enclosure. The servers can be used in support of the data center industry. Use of a battery backup unit (BBU) in place of traditional solutions, such as lead-acid based UPS systems has grown in popularity. Similar to USP systems, the role of the BBU is to provide essential battery energy to support applications (such as in a data center) as a backup energy source when a main source (e.g., the AC mains) is not available (e.g., in case of a black out). One result of the BBU's new role in the data center space is the relocation of the BBU from a centralized battery room to a data center IT room. Thus, it is important to guarantee the availability of battery energy and therefore the functionality of the BBU.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As used herein, a switch is configured to be "open" (or off) when there is no continuity between one terminal and another terminal (e.g., an input contact and an output contact) of the switch, which does not allow electric current to flow through the switch. In contrast, a switch is configured to be "closed" (or on) when there is continuity between the two terminals of the switch, which allows the electric current to flow through the switch. In one embodiment, a switch may be a bidirectional switch, which allows a two-way bidirectional flow of current when on, based on the polarity of the two terminals of the switch. In one embodiment, a switch as described herein may have one or more terminals.

The present disclosure solves the problem of managing battery power in a battery backup unit (BBU) shelf that is employed in a data center. Specifically, BBUs may be placed inside a server rack in order to provide essential battery energy to components inside the rack (e.g., servers) when a main source is not available. For instance, BBUs may include a power converter that draws electrical energy from a battery source (e.g., battery pack) and outputs power across a rack busbar, from which one or more servers may be powered in order to ensure functionality of the servers during an outage. Such BBUs, however, have drawbacks. For example, BBUs usually utilize one power converter that draws energy from one battery pack in order to provide power across one rack busbar. Server racks, however, may require several rack busbars, each capable of providing a different power output (e.g., with different voltages) for different components. As a result, a server rack may require multiple BBUs, each configured differently (e.g., with different battery packs and/or different converters that have different power ratings) in order to accommodate the racks power requirements. The practical need of several BBUs may increase the overall hardware cost and complexity of the rack.

The solution proposed in the current disclosure, however, provides a battery management system design that is able to provide power for multiple rack busbars, which may simplify the implementation and reduce a total cost of ownership. In particular, the system may include a BBU shelf with one or more bus connectors, a battery module with one or more battery cell packages (or packs), and a converter module that is designed to draw stored energy from the cell packages and provide different (or similar) power levels across the one or more bus connectors, which when coupled to respective rack busbars of a server rack is able to satisfy power requirements of components with different power needs. For instance, the converter module may provide a 12 V power output over one bus connector and provide a 48 V power output over another. The converter module is capable of outputting different power levels by utilizing one or more converters that share common busbars and are separated by a series of switches, where the converters may provide desired power levels across specific bus connectors based on which switches are open or closed. Furthermore, such a design enables the converters to draw power from one or more battery cell packages, rather than each converter only being coupled to one package, as in previous BBU implementations.

In addition, conventional BBUs may be susceptible to internal faults. Specifically, electrical components of some BBUs may be integrated (e.g., fixed) within the BBU, which in case of an internal failure or fault may render the BBU inoperable. The battery management system described herein provides a fault tolerant system that is capable of continuing to operate in case of one or more faults. For instance, in the case of a fault, the system may control the series of switches to isolate the fault, while continuing to provide power. Moreover, the proposed solution of the present disclosure provides a modular system in which each of the components are removably connected to one another. As a result, when one component (e.g., a converter or an entire module) fails, the component may be removed from the system and replaced with another similar (or different) component. The fault tolerant nature of the management system increases the reliability of the system, ensuring full (or at least partial) functionality of the system even in the case of one or more internal faults.

According to one embodiment, a battery management system includes: a BBU shelf with a set of bus connectors; a battery module arranged to have a set of battery cell packages, each cell package comprising one or more battery cells; and a converter module having a set of converters that are each configured to regulate and output power to one or more bus connectors of the set of bus connectors, a first busbar to which an input of each converter is connected, the first busbar comprises a first plurality of switches, each switch of the first plurality of switches is disposed between adjacently connected converters, a second busbar to which the input of each converter is connected via a first switch and to which each cell package is connected via a second switch, the second busbar comprises a second plurality of switches, each switch of the second plurality of switches is disposed between adjacently connected converters, cell packages, or a combination thereof, and a third busbar to which an output of each converter is connected and to which each bus connector is connected via a third switch, the third busbar comprises a third plurality of switches, each switch of the third plurality of switches is disposed between adjacently connected converters, bus connectors, or a combination thereof.

In one embodiment, the battery management system further includes a controller that is configured to control each of the switches of the converter module such that each converter draws power from one or more cell packages and each converter provides the output power to the one or more bus connectors. In another embodiment, the BBU shelf includes a container, wherein the converter module and the battery module are removably housed within the container of the BBU shelf. In one embodiment, the battery module is designed to slide into and out of the container of the BBU shelf via an opening of the container, wherein the opening of the container has a width from 380 mm to 580 mm, while the battery module has a width that is from 10 mm to 50 mm less than the width of the opening of the container.

In one embodiment, the battery module includes a battery output connector and the converter module comprises an input connector, wherein the battery output connector is arranged to removably connect to the input connector, thereby connecting the cell packages to the second busbar. In another embodiment, the input of each converter is removably connected to a portion of the first busbar that is connected to a portion of the second busbar via the first switch and the output of each converter is removably connected to a portion of the third busbar, such that each converter may be individually removed from the converter module. In some embodiments, each switch includes back-to-back N-channel metal-oxide-semiconductor field-effect transistors (MOSFETs).

According to one embodiment, a BBU shelf includes the set of bus connectors, the battery module, and the converter module, as described herein.

According to another embodiment, an electronic rack includes several pieces of Information Technology (IT) equipment, at least one of the pieces of IT equipment including one or more servers to provide data processing services, a power supply unit coupled to the pieces of IT equipment, and a BBU shelf to provide backup power to the pieces of IT equipment when the power supply is unavailable. The BBU shelf includes the set of bus connectors, the battery module, and the converter module, as previously described.

Figure 1:
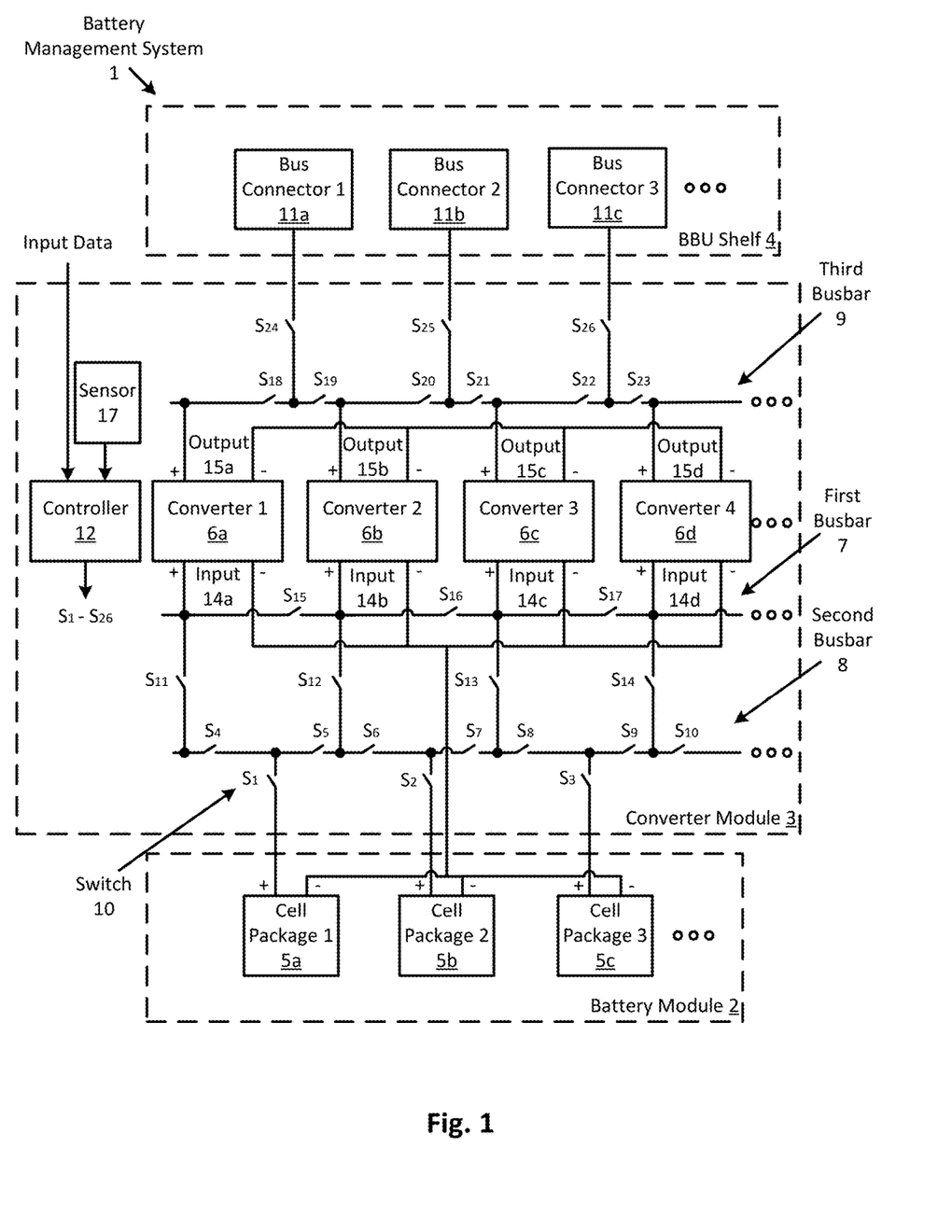
FIG. 1 illustrates a battery management system that includes a battery module, a converter module, and a battery backup unit (BBU) shelf according to one embodiment.

FIG. 1 illustrates a battery management system 1 that includes a battery module 2, a converter module 3, and a battery backup unit (BBU) shelf 4 according to one embodiment. In one embodiment, the battery module 2 is (removably) connected (or coupled) to the converter module 3, which is (removably) connected to the BBU shelf 4. In another embodiment, the system may include more (or less) components. For instance, the system may include two or more converter modules, each connected to one or more battery modules, where each converter module may supply power to one or more bus connectors of the BBU shelf. More about the converter module supply power to bus connectors is described herein.

The battery module 2 includes several (three) battery cell packages (or packs) 5a-5c, each cell package may include one or more battery cells that are series-connected, parallel-connected, or a combination thereof. The battery cells may be of any type, such as Lithium-ion. In one embodiment, each of the cell packages may be the same (e.g., with the same number of battery cells), such that they have (approximately) the same capacity and/or the same power discharge rate. In another embodiment, at least some of the cell packages may be different (e.g., based on an arrangement of battery cells contained therein). For instance, the first cell package 5a may be designed to have a capacity of 2 kWh, while the second cell package 5b may be designed to have a capacity of 4 kWh. In some embodiments, the battery module may be arranged to have more or less cell packages (e.g., one cell package).

The BBU shelf 4 includes several (three) bus connectors 11a-11c. As described herein, each of the bus connectors is arranged to connect to a rack busbar of an electronic rack in order to provide power to one or more components that are connected to the busbar. Specifically, the rack busbar may be a metallic bar that is arranged within the electronic rack and includes one or more ports to which components within the rack may electrically couple in order to draw power. In one embodiment, the connectors may be any type of electrical connectors that are arranged to removably connect to (e.g., a connector of) a rack busbar. For instance, the connectors may be female-type connectors (or terminals) that are designed to receive a male-type connector.

The converter module 3 includes several (four) power converters (or converters) 6a-6d, three common busbars (or busbars) 7-9, several switches 10 ($S_1$-$S_{26}$, as shown), one or more sensors 17, and one or more controllers 12. In one embodiment, the converter module may include less or more components. For instance, the module may include less (e.g., one or more) switches, converters, sensors, and/or busbars.

The converters 6a-6d are each configured to draw energy stored within one or more of the cell packages 5a-5c as input power (e.g., via respective inputs 14a-14d), and are each configured to regulate and output power, which is converted from the input power (e.g., via respective outputs 15a-15d). As described herein, each of the converters is configured to output the power to one or more bus connectors 11a-11c. Specifically, the converters are configured to convert one or more input voltages that are across one or more cell packages 5a-5c into one or more output voltages, where each bus connector 11a may supply a respective output voltage to a specific rack busbar of a (e.g., electronic rack in a) data center. In one embodiment, each of the converters may have a same power rating (e.g., 4 kW), which relates to a maximum amount of power that the converter may provide to one or more bus connectors. In another embodiment, at least some of the converters may be different with respect to one another. For instance, some may have a lower power rating (e.g., 2 kW). In one embodiment, the converter module may have any number of converters. In another embodiment, the converter module may have a minimum number of converters based on the number of buss connectors 11a-11c of the BBU shelf 4. For example, the converter module may include at least the same number or more converters as a number of bus connectors. For example, the converter module may have one or more converters for each bus connector.

In one embodiment, the converters may be any type of direct current (DC) to direct current (DC) converters. For example, each converter may be one of a step-down (buck) converter, a step-up (boost) converter, or a buck-boost converter. In some embodiments, one or more of the converters may be an alternating current (AC) to DC converter that is configured to convert an AC voltage into a DC voltage, or may be a DC-to-AC converter that is configured to convert DC voltage into AC voltage.

Each of the busbars 7-9 may be electrical components that are arranged to distribute current power between components within the converter module. For instance, one or more of the busbars may be composed of conductive material, such as a metallic (e.g., copper) component (e.g., bar) that is mounted within the converter module. In another embodiment, one or more of the busbars may be mounted upon (or formed into) one or more printed circuit boards (PCB) as PCB traces. As shown, each of the busbars includes one or more nodes (e.g., black dots) that are points at which one or more components connect to a respective busbar.

As shown, each input 14 (specifically a positive input terminal) of each of the converters 6a-6d is connected (or coupled) along the first busbar 7. The first busbar also includes several switches $S_{15}$-$S_{17}$, each switch is disposed between adjacently connected converters. For instance, as shown, $S_{15}$ is between (e.g., a node along the first busbar at which) the input 14a of the first converter 6a connects to the first busbar and (e.g., another node along the first busbar at which) the input 14b of the second converter 6b that is connected to the first busbar. In one embodiment, the busbar "includes a switch" such that the switch is disposed between two portions of the busbar, such that one portion is connected to one terminal of the switch and the other portion is connected to another terminal of the switch. Thus, as described herein, when the switch is off, current is prevented from flowing from one portion, through the switch, and into the other portion. Whereas, when the switch is on, current may flow between the two portions and through the switch.

The second busbar 8 connects to each of the cell packages 5a-5c and connects to each of the converters 6a-6d. Specifically, each input 14 of each of the converters is connected to the second busbar via a respective (first) switch, $S_{11}$-$S_{14}$, and each (positive output terminal) of the cell packages is connected along the second busbar via a respective (second) switch $S_1$-$S_3$. The second busbar also includes several switches $S_4$-$S_{10}$, each of which is disposed between each pair of adjacently connected converters and cell packages. For instance, $S_4$ is between (e.g., a node along the second busbar at which) the input 14a of the first converter connects to the second busbar and (e.g., another node along the second busbar at which) the output of the first cell package 5a is connected to the second busbar.

The third busbar 9 connects to each bus connector 11a-11c of the BBU shelf 4, and connects to each of the converters 6a-6d. In particular, each output 15 (specifically a positive output terminal) of each of the converters is connected along the third busbar, and each bus connector is connected along the third busbar via a respective (third) switch $S_{24}$-$S_{26}$. The third busbar also includes several switches $S_{18}$-$S_{23}$, each of which is disposed between each pair of adjacently connected converters and bus connectors.

In one embodiment, the converter module 3 may have different configurations. For example, the second busbar 8 may have adjacently connected converters 6a-6d, adjacently connected cell packages 5a-5c, or a combination thereof. For example, two or more cell packages may be adjacently connected along the second busbar, such that no converter is connected to the second busbar in between them. To illustrate, the battery module 2 may include additional cell packages, where one additional package is connected to the second busbar 8 between $S_8$ and $S_9$, such that two cell packages (the additional one and the third cell package 5c) are adjacently connected to the second busbar. As another example configuration, different components may be connected along different locations then illustrated in this figure. For instance, the second bus connector 11b may connect to the third busbar 9 at a point after which the output 15c of the third converter 6c connects to the third busbar 9 (e.g., after a node at which the output 15c connects to the third busbar but before $S_{22}$). In some embodiments, each of the switches of the busbars is disposed between adjacently connected converters, bus connectors, or a combination thereof. Returning to the first example configuration, at least one switch is disposed between the adjacently connected additional cell package and the third cell package 5c. In one embodiment, regardless of the configuration, the converter module may include a switch disposed between any adjacently connected components. Having switches disposed between connected components enables for system configuration, as well as the ability to isolate components as needed (e.g., in case of a fault). More about isolating a fault is described herein.

The sensor 17 may be any type of sensor that is configured to detect (or sense) characteristics of the battery management system (e.g., the converter module 2), and is configured to generate (or produce) sensor data that represents the detected characteristics. Specifically, the sensor may be any sensor that produces sensor data that may be used by the controller 12 to determine whether there is a fault within the system, and in response the controller may open and/or close one or more switches. More about the operations performed by the controller is described herein.

In one embodiment, the sensor 17 may be a temperature sensor (e.g., thermocouple) that is for sensing a temperature, and producing a temperature signal (as sensor data) that represents the sensed temperature. In one embodiment, the temperature sensor may be disposed inside the converter module, and configured to sense an internal temperature, or may be disposed outside the converter module, and configured to sense the (external) surface temperature of the converter module. In another embodiment, the temperature sensor may be disposed next to or on a component within the converter module, such as a converter or a switch. In which case, the sensor may be configured to sense a temperature of the component. In another embodiment, the sensor 17 may be configured to sense power characteristics within the system, such as a voltage sensor and/or a current sensor. For example, the sensor may include a shunt resistor and may be configured to measure the voltage across the shunt resistor as an electrical signal that represents the current passing through the resistor. In another embodiment, the sensor 17 may be a battery sensor that is configured to measure a current to (and from) a battery cell package and/or monitor other battery characteristics, such as a voltage of the battery cell package, a state of charge, and a state of health. In one embodiment, the system may include one or more sensors.

The controller 12 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory.

In one embodiment, the controller 12 may be configured to control each (or at least some) of the switches of the converter module such that each converter draws power from one or more cell packages and each converter provides output power to one or more bus connectors. Specifically, the controller may control the switches based on obtained data, such as input data and/or sensor data. For instance, the controller 12 may be configured to obtain sensor data, and may be configured to adjust (or change) an open/closed configuration of one or more switches 10 (e.g., $S_1$-$S_{26}$) based on the obtained sensor data. In particular, the controller may use the sensor data to determine whether there are one or more faults within the battery management system 1, and in response adjust a current open/closed configuration. The controller may adjust the configuration for many reasons, for example when a fault occurs the controller may adjust the configuration in order to maintain functionality of the system 1. As another example, the controller may open certain switches in order to isolate any fault that has occurred (e.g., to prevent any damage that is a result of the fault from spreading). In another example, the controller may adjust the configuration based on battery characteristics (that are obtained by one or more battery sensors). For instance, battery characteristics may indicate a battery cell package has a low state of charge, which as a result the controller may adjust the open/closed configuration in order to draw power from a full cell package. An example is as follows.

In one configuration, the converter module 3 may be configured such that third converter 6c is a redundant converter, where the second converter 6b and third converter have the same (or similar) power rating (e.g., 3 kW), while the first, second, and fourth converters provide power to the first, second, and third bus connectors, respectively. For example, in this open/closed configuration, 1) $S_1$, $S_4$, $S_{11}$, $S_{18}$, and $S_{24}$ may be closed so that the first converter 6a may draw power from the first cell package 5a in order to provide output power to the first bus connector 11a, 2) $S_2$, $S_6$, $S_{12}$, $S_{20}$, and $S_{25}$ may be closed so that the second converter 6b may draw power from the second cell package 5b in order to provide output power to the second bus connector 11b, and 3) $S_3$, $S_9$, $S_{14}$, $S_{23}$, and $S_{26}$ may be closed so that the fourth converter 6d may draw power from the third cell package 5c in order to provide output power to the third bus connector 11c, while the remainder of the switches may be open.

During operation, the controller 12 may obtain sensor data from one or more sensors 17 and determine that there is a fault in the system. For example, the controller may obtain temperature data from a temperature sensor that is arranged to sense the temperature of the second converter 6b. The controller may determine that the temperature exceeds a temperature threshold, which may be indicative of a fault (or malfunction) in the converter. In another embodiment, the controller may obtain current readings from one or more current sensors and determine that there is a short (e.g., leading to the second converter 6b) within the system based on an increase (e.g., above a threshold) in current flowing through the system. Thus, the controller may determine based on the data that there is a fault in (or leading to) the second converter. As a result, the controller may adjust the open/closed configuration by transmitting one or more control signals to one or more switches in order to deactivate the second converter and to activate the third converter. For instance, the controller may close $S_7$, $S_{13}$, and $S_{21}$ and (e.g., at least partially contemporaneously) may open at least one of $S_6$, $S_{12}$, and $S_{20}$. Thus, the system may continue to function in the case of a detected fault.

In one embodiment, the controller 12 may be configured to adjust the open/closed configuration based on input data, such as user input data. Specifically, the controller may obtain user input data from a user input device, such as a desktop computer, with which the controller is in communication. Once obtained, the input data may configure the controller to adjust the open/closed configuration of one or more switches. For example, a user may configure the battery management system 1 such that two of the converters draw power from a single battery. For instance, the user may configure the controller such that the first converter 6a and the second converter 6b both draw input power from the first battery cell package 5a in order to convert the power into output power for at least one bus connector (e.g., the first bus connector 11a). In this example, the first battery cell package may have a capacity that is at least twice the input power rating of both converters. Specifically, the first battery cell package 5a may have a capacity of 4 kWh, while both the first and second converters have a power rating of 2 kW. Thus, unlike conventional BBUs in which a converter must have a power rating that matches its battery module, the converters and the cell packages of the battery management system 1 do not need to match each other, since the systems open/closed configurations may be adjusted to accommodate power/energy requirements for the converters and cell packages.

In one embodiment, the controller 12 may obtain sensor data and/or input data via a wireless and/or wired connection. For instance, the controller may be configured to establish a wireless connection with one or more sensors via any wireless protocol (e.g., BLUETOOTH protocol). Once established, the sensor may wirelessly transmit the sensor data to the controller.

In one embodiment, at least some of the components of the converter module 3 may be removable from the module. Specifically, each of the of the components may be removably mounted upon one or more PCBs, where at least some of the components are connected to each other via one or more traces. For instance, each of the converters 6a-6d may be removable in order to allow a user to replace a converter in which a fault is detected. In particular, the input 14 of each converter may be removably connected to a portion of the first busbar 7 (e.g., at a node) that is connected to a portion of the second busbar 8 via a switch (e.g., in the case of the first converter 6a, $S_{11}$), and the output 15 of each converter may be removably connected to a portion of the third busbar 9 (e.g., at a node), such that each converter may be individually removed from the converter module. For example, the input and output may include connectors, which may be similar to the bus connectors 11.

Figure 2:
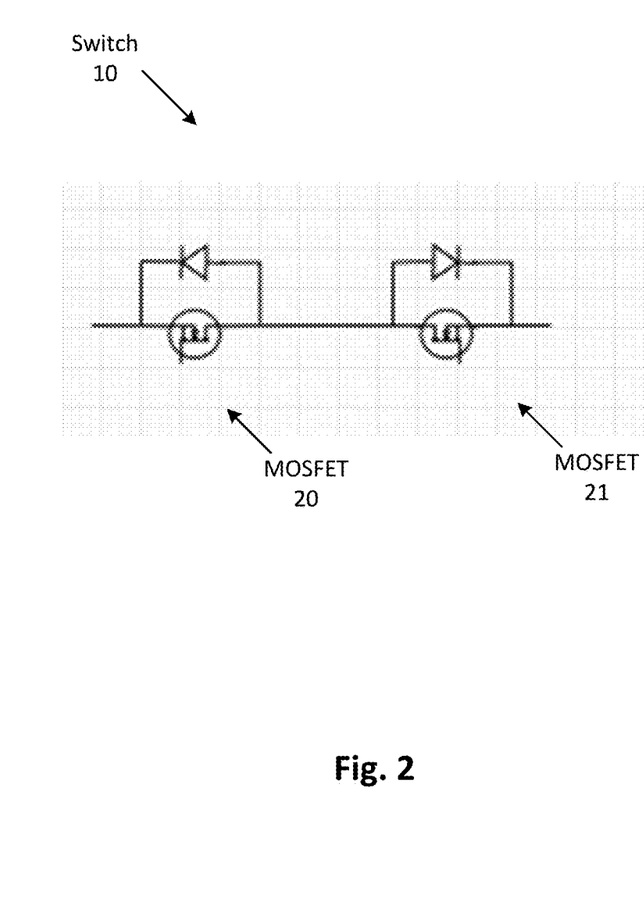
FIG. 2 shows an example of a switch of the battery management system according to one embodiment.

FIG. 2 shows an example of a switch 10 of the battery management system 1 according to one embodiment. As illustrated, the switch 10 may be back-to-back N-channel metal-oxide-semiconductor field-effect transistors (MOSFETs) 20 and 21. Such a switch is a bidirectional switch, as described herein, which enables the system to discharge and charge the batter cell packages. For instance, the system may discharge and charge the cell packages at different times (e.g., discharge while there is an outage of the main power source and charge while the main power source is available), or the system may discharge and charge different cell packages simultaneously. For instance, the system may draw battery energy stored in some battery cell packages to provide output power to one or more bus connectors (of the BBU shelf), and draw power from an external power source in order to charge other battery cell packages. In one embodiment, the switch 10 may be a single transistor (e.g., MOSFET). In another embodiment, the switch may be any type of switch (or relay) that may be controlled to switch on or off based on control signals obtained from one or more controllers, as described herein.

In one embodiment, the transistors of the switch may be arranged differently than the switch illustrated in this figure. For instance, the switch may include two or more transistors that are arranged in parallel. As an example, the switch may include two sets of series connected MOSFETS 20 and 21, where the sets are connected in parallel with one another.

In some embodiments, at least some of the switches 10 may be high current switches that are configured to carry (or pass) high current (e.g., above 500 Amps). For example, each of the switches connecting the bus connectors 11a-11c to the third busbar 9 (e.g., $S_{24}$-$S_{26}$) may each be high current switches.

Figure 3:
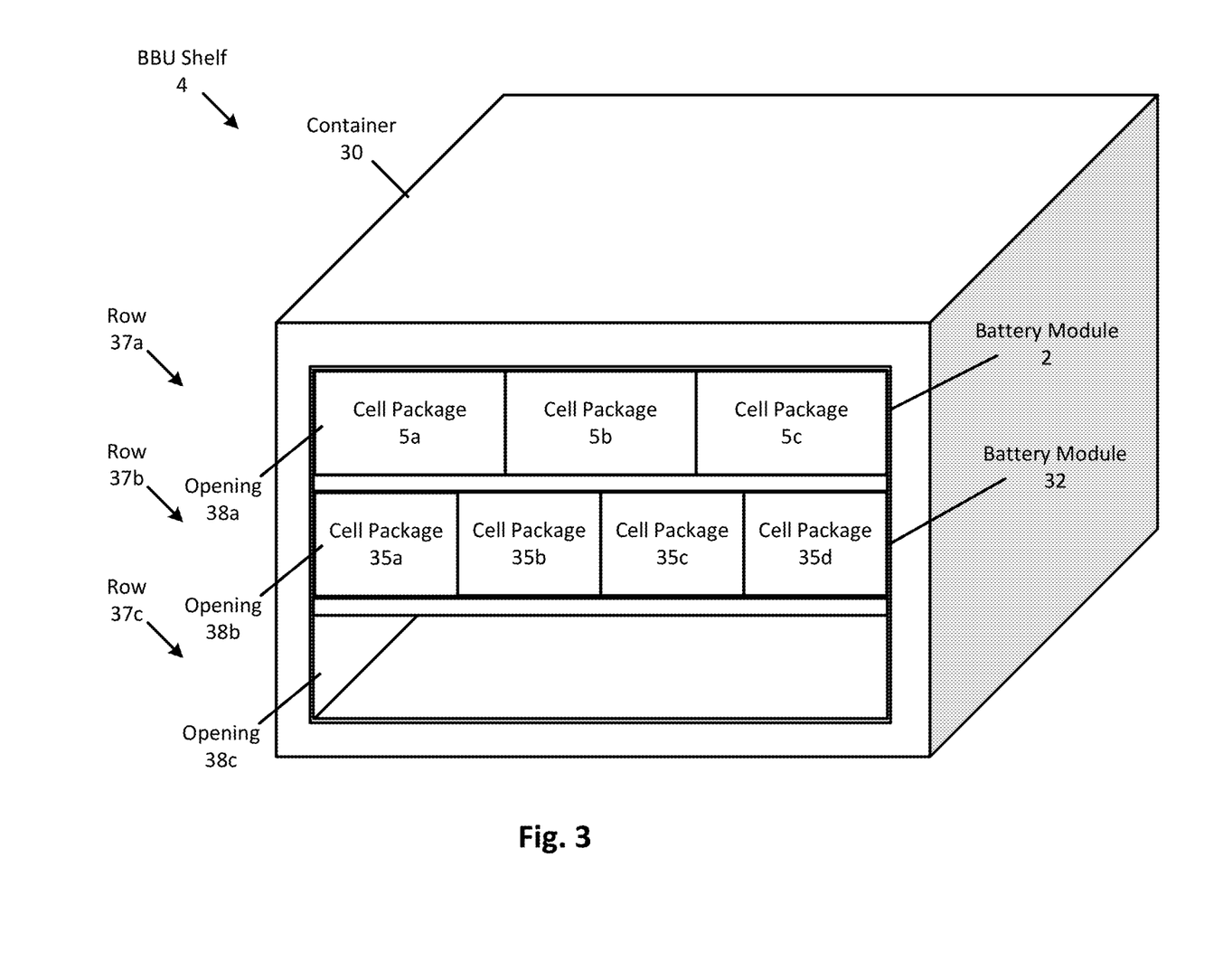
FIG. 3 is a perspective view of a BBU shelf according to one embodiment.

FIG. 3 is a perspective view of a BBU shelf according to one embodiment. In particular, this figure shows the front end of the BBU shelf in the perspective view. As illustrated, the BBU shelf includes a container 30 that is a rectangular box. In one embodiment, the container may have any shape, such as being cube-shaped or cylindrically-shaped. In one embodiment, the container may be composed of any type of material, such as a metal or an alloy (e.g., steel).

The container 30 includes three rows 37a-37c, each with an opening 38. In one embodiment, the container may include more or less rows. In some embodiments, each of the rows is adapted to hold (or house) one or more components of the battery management system 1. As illustrated, the first row 37a is holding battery module 2, the second row 37b is holding battery module 32, and the third row 37c is empty. In one embodiment, the rows may be partitioned (e.g., into slots), such that at least one or more battery modules may be housed in a single row.

In one embodiment, each of the openings may be shaped (and the battery modules may be designed) in order to allow battery modules to slide into and out of the container of the BBU shelf. For instance, the battery module may be a rectangular-shaped container (which contains one or more cell packages) that is sized to fit into the opening, which may be rectangular shaped. Thus, the battery module 2 may be designed to slide into opening 38a of row 37a in order for the BBU shelf to house the module. In one embodiment, the battery modules may be removably housed within the (container of the) BBU shelf, such that battery modules may be added or replaced as needed.

As shown, the BBU shelf 4 may house different battery modules, each with different energy capacities. For instance, the BBU shelf is housing battery module 2 that has three cell packages 5a-5c in row 37a, and is housing battery module 32 that has four cell packages 35a-35d in row 37b. In one embodiment, cell packages 35 may have capacity (e.g., of 2 kWh) that is different than a capacity (e.g., of 4 kWh) of cell packages 5. As described herein, this may enable the BBU shelf to supply power to different bus connectors from energy stored in different battery modules.

Figure 4:
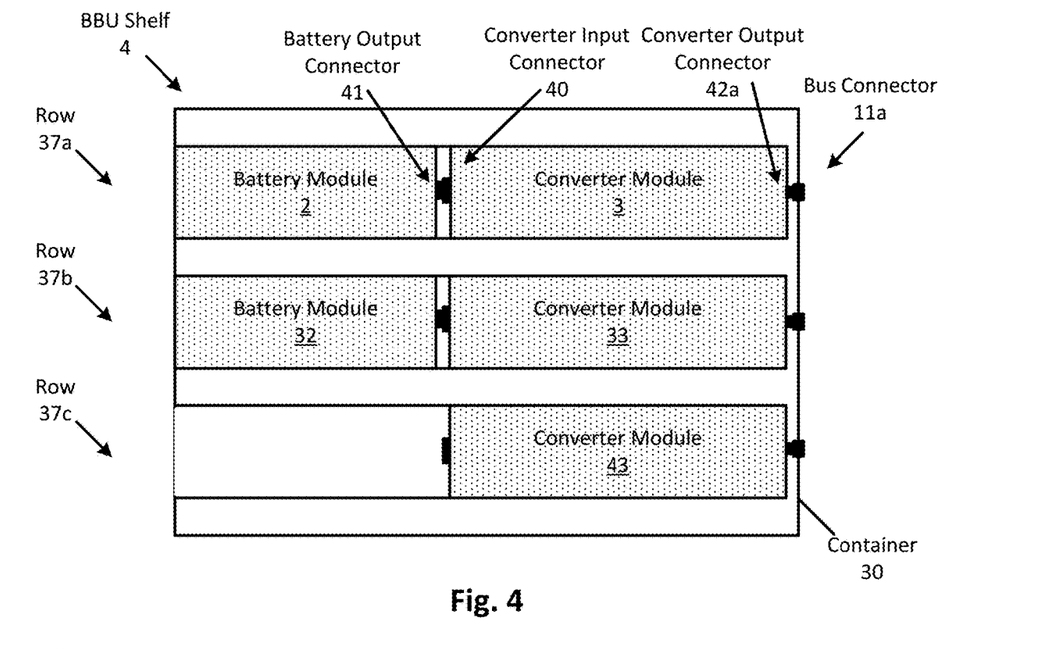
FIG. 4 shows a side cross-sectional view of the BBU shelf.

FIG. 4 shows a side cross-sectional view of the BBU shelf. As shown, the (container of the) BBU shelf 4 is housing multiple battery modules and multiple converter modules that are connected to one or more bus connectors in several rows. Specifically, the first row 37a is housing battery module 2 and converter module 3, the second row 37b is housing battery module 32 and converter module 33, and the third row 37c is housing converter module 43.

As shown, the BBU shelf may be designed to hold multiple converter modules, each for powering one or more rack busbars via one or more bus connectors of the BBU shelf. For example, the modules in the first row 37a may be arranged to power at least three rack busbars, while the modules in the second row 37b and the third row 37c may be arranged to power one or more rack busbars. Thus, a user may be able to customize the power output of the BBU shelf in order to satisfy a data center's power requirements.

In one embodiment, the battery modules and converter modules are removably housed within the container 30 of the BBU shelf 4. Specifically, the modules may be removed or added (e.g., via the openings 38). As an example, battery module 32 may be removed from row 37b, and then added to row 37c in order to connect the module 32 with the converter module 43. In one embodiment, similar to the battery modules, converter modules may be designed to slide into and out of the BBU shelf. In some embodiments, the converter module may be a rectangular-shaped container (which contains at least some of the components illustrated in FIG. 1) and is sized to slide into the openings 38a-38c of the container 30. To remove a converter module, the battery module that is housed within the same row must first be removed. For example, to remove converter module 3 (as shown), a user must first remove the battery module 2. In some embodiments, the container may include other openings (e.g., on the side), which may enable a user to remove the converter module without first removing the battery module. In another embodiment, the converter modules may be sized differently than the battery modules (e.g., being longer than the battery module).

In one embodiment, each battery module is arranged to removably couple to a respective converter module, which is also arranged to removably couple to one or more bus connectors of the BBU shelf. Specifically, each of the modules includes one or more connectors that enable the modules to couple to each other and to the bus connectors. As illustrated, battery module 2 includes a battery output connector 41, and the converter module 3 includes a converter input connector 40 and at least one converter output connector 42 (shown as converter output connector 42a). The battery output connector 41 is arranged to removably connect to the converter input connector 40 in order to connect the battery module to the converter module. Specifically, connecting the two connectors together connects (at least some of the) cell packages 5a-5c of battery module 2 to the second busbar 8 of the converter module 3, as shown in FIG. 1. In one embodiment, the modules may have multiple connectors 40 and 41, respectively. For instance, the battery module 2 may include an output connector 41 for each cell package contained therein. As another example, the converter module may include multiple converter input connectors, which may enable the module to connect to one or more battery modules (e.g., that are housed in the same row or in different rows). The converter output connector 42a is arranged to removably connect to bus connector 11a, thereby connecting the bus connector 11a to the third busbar 9, as shown in FIG. 1. In one embodiment, the converter module may include more converter output connectors, as shown in FIG. 5 below.

Figure 5:
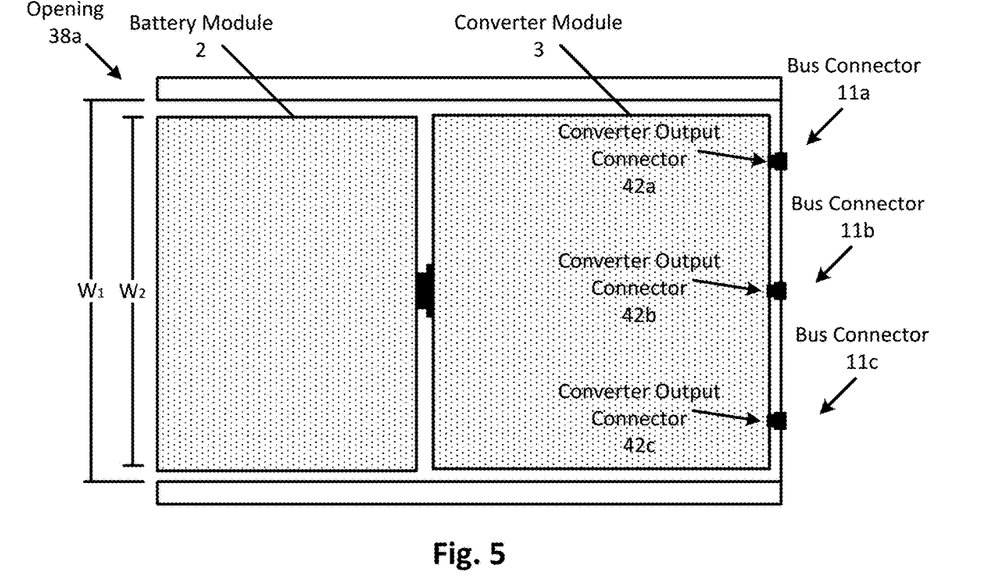
FIG. 5 shows a top-down cross-sectional view of the BBU shelf.

FIG. 5 shows a top-down cross-sectional view of the BBU shelf. This view shows that the converter module 3 includes three converter output connectors 42a-42c that are each arranged to removably connect to one of the three bus connectors 11a-11c, respectively. This view also illustrates some dimensions of the BBU shelf and modules. Specifically, the opening 38a has a width, $W_1$, that may range from 380 mm to 580 mm. In one embodiment, $W_1$ may range from 440 mm to 520 mm. In another embodiment, $W_1$ is equal to or less than 480 mm. In some embodiments, each of the openings 38a-38c may have the same or similar width. The battery module 2 has a width, $W_2$, that may be from 10 mm to 50 mm less than $W_1$. In another embodiment, $W_2$ may be 30 mm less than $W_1$. For example, when $W_1$ is 480 mm, $W_2$ may be 450 mm. In one embodiment, $W_2$ is less than $W_1$ in order to allow the battery module to be slid into the opening 38a and through the row 37a in order for the container 30 to house the module. In one embodiment, the converter module 3 may a width that is the same or similar to $W_2$. In some embodiments, $W_1$ may represent the width of the entire container 30 (from one side to another side). In this case, the opening may have a width that is less than $W_1$, while $W_2$ may still be a width that is less than $W_1$ (e.g., by 30 mm).

Figure 6:
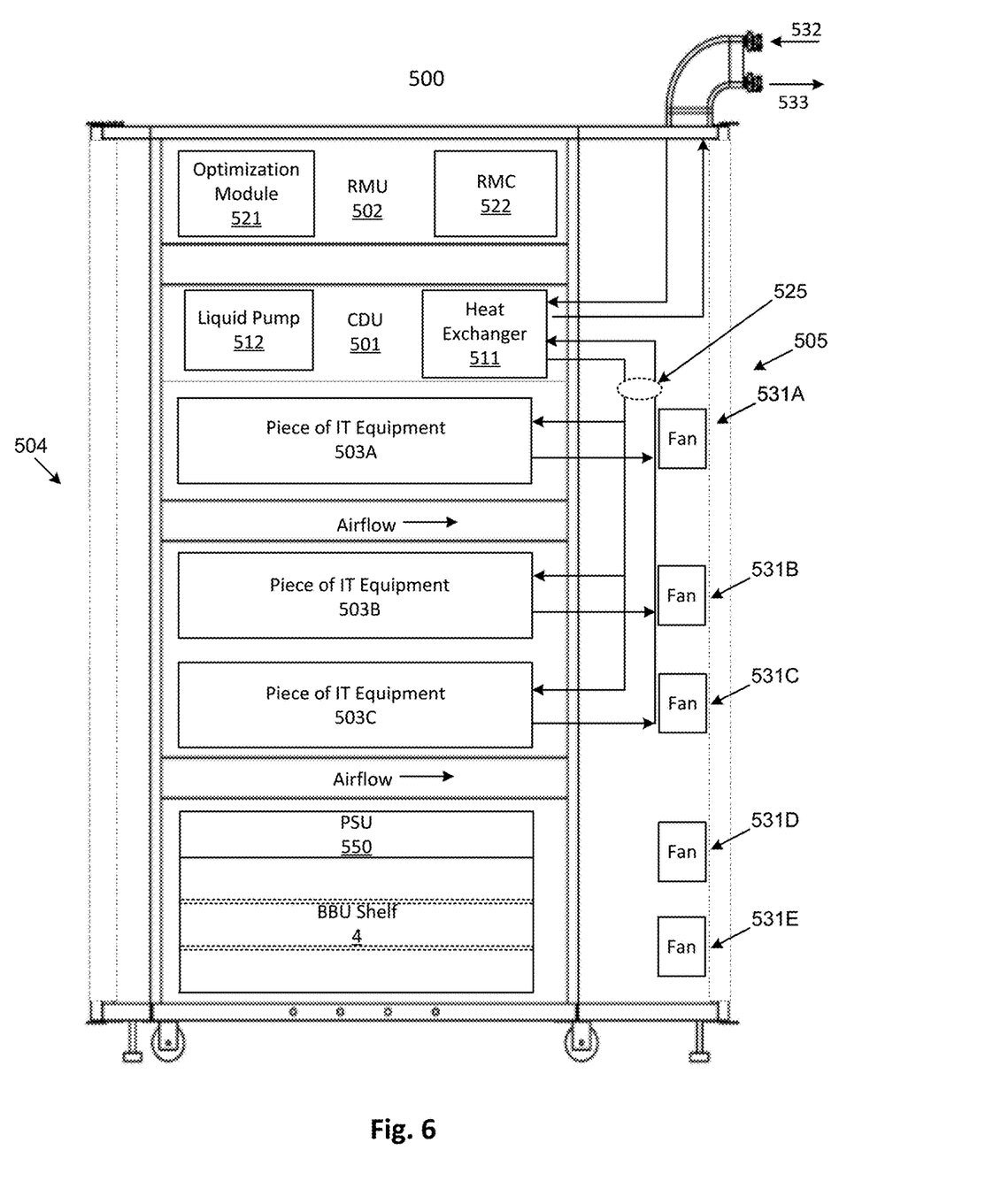
FIG. 6 is an example of an electronic rack with the BBU shelf according to one embodiment.

FIG. 6 is a block diagram illustrating an example of an electronic rack with the BBU shelf 4 according to one embodiment. Electronic rack 500 may include one or more server slots to contain one or more servers respectively. Each server includes one or more information technology (IT) components (e.g., processors, memory, storage devices, network interfaces). According to one embodiment, electronic rack 500 includes, but is not limited to, CDU 501, rack management unit (RMU) 502 (optional), a power supply unit (PSU) 550, the BBU shelf 4, and one or more pieces of IT equipment (or IT equipment) 503A-503C, which may be any type of IT equipment, such as server blades. The IT equipment 503 can be inserted into an array of server slots respectively from frontend 504 or backend 505 of electronic rack 500. The PSU 550 and/or BBU shelf 4 may be inserted into any of the server slots within the electronic rack 500. In another embodiment, the BBU shelf 4 may be inserted into several slots (e.g., taking up two or more slots within the rack). As illustrated, the BBU shelf 4 is inserted at the bottom (below the PSU 550) of the rack. In one embodiment, the BBU shelf 4 is located in one or more of the bottom most slots to separate the BBU shelf from pieces of IT equipment (e.g., in order to isolate the pieces of IT equipment from the BBU shelf in case of failure). In one embodiment, the rack 500 may include one or more BBU shelves, each designed to house one or more battery modules and/or one or more converter modules, as described herein.

Note that although there are only three pieces of IT equipment 503A-503C shown here, more or fewer pieces of IT equipment may be maintained within electronic rack 500. Also note that the particular positions of CDU 501, RMU 502, PSU 550, BBU shelf 4, and IT equipment 503 are shown for the purpose of illustration only; other arrangements or configurations of these components. may also be implemented. Note that electronic rack 500 can be either open to the environment or partially contained by a rack container, as long as the cooling fans can generate airflows from the frontend to the backend (or generate airflows from the backend to the frontend).

In addition, one or more fan modules can be associated with each of the pieces of IT equipment 503 and/or the BBU shelf 4 (and the PSU 550). In one embodiment, fan modules 531A-531E, collectively referred to as fan modules 531, and are associated with the pieces of IT equipment 503A-503C and BBU shelf 4, respectively. Each of the fan modules 531 includes one or more cooling fans. Fan modules 531 may be mounted on the backends of IT equipment 503 and/or BBU shelf 4 to generate airflows flowing from frontend 504, traveling through the rack 500, and existing at backend 505 of electronic rack 500. In another embodiment, one or more of the fan modules may be positioned on the frontend 504 of the rack 500. Such frontend fans may be configured to push air into the pieces of IT equipment 503 and/or the BBU shelf 4.

In one embodiment, CDU 501 mainly includes heat exchanger 511, liquid pump 512, and a pump controller (not shown), and some other components such as a liquid reservoir, a power supply, monitoring sensors and so on. Heat exchanger 511 may be a liquid-to-liquid heat exchanger. Heat exchanger 511 includes a first loop with inlet and outlet ports having a first pair of liquid connectors coupled to external liquid supply/return lines 532-533 to form a primary loop. The connectors coupled to the external liquid supply/return lines 532-533 may be disposed or mounted on backend 505 of electronic rack 500. The liquid supply/return lines 532-533 are coupled to a set of room manifolds, which are coupled to an external heat removal system, or extremal cooling loop. In addition, heat exchanger 511 further includes a second loop with two ports having a second pair of liquid connectors coupled to liquid manifold 525 to form a secondary loop, which may include a supply manifold to supply cooling liquid to the pieces of IT equipment 503 and a return manifold to return warmer liquid back to CDU 501. Note that CDUs 501 can be any kind of CDUs commercially available or customized ones. Thus, the details of CDUs 501 will not be described herein.

Each of the pieces of IT equipment 503 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. IT equipment 503 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

In one embodiment, the BBU shelf 4 is configured to provide backup power (e.g., drawing battery energy from one or more battery modules contained therein) to the rack (e.g., one or more pieces of IT equipment 503) when the rack is not drawing power from a main power source, such as during a black out. In one embodiment, operations performed by the controller 12 of the converter module contained within the BBU shelf 4 may be performed by any of the components (e.g., IT equipment 503A) within the rack 500. For example, the IT equipment 503A may include a controller that is communicatively coupled with one or more switches contained within the converter module, and may be configured to control the switches based on various operating conditions, as described herein.

Electronic rack 500 further includes optional RMU 502 configured to provide and manage power supplied to servers 503, fan modules 531, and CDU 501. Optimization module 521 and RMC 522 can communicate with a controller in some of the applications. RMU 502 may be coupled to PSU 550 to manage the power consumption of the PSU. The PSU 550 may include the necessary circuitry (e.g., an alternating current (AC) to direct current (DC) or DC to DC power converter, backup battery, transformer, or regulator, etc.) to provide power to the rest of the components of electronic rack 500.

In one embodiment, RMU 502 includes optimization module 521 and rack management controller (RMC) 522. RMC 522 may include a monitor to monitor operating status of various components within electronic rack 500, such as, for example, the pieces of IT equipment 503, CDU 501, and fan modules 531. Specifically, the monitor receives operating data from various sensors representing the operating environments of electronic rack 500. For example, the monitor may receive operating data representing temperatures of the processors, cooling liquid, and airflows, which may be captured and collected via various temperature sensors. The monitor may also receive data representing the fan power and pump power generated by the fan modules 531 and liquid pump 512, which may be proportional to their respective speeds. These operating data are referred to as real-time operating data. Note that the monitor may be implemented as a separate module within RMU 502.

Based on the operating data, optimization module 521 performs an optimization using a predetermined optimization function or optimization model to derive a set of optimal fan speeds for fan modules 531 and an optimal pump speed for liquid pump 512, such that the total power consumption of liquid pump 512 and fan modules 531 reaches minimum, while the operating data associated with liquid pump 512 and cooling fans of fan modules 531 are within their respective designed specifications. Once the optimal pump speed and optimal fan speeds have been determined, RMC 522 configures liquid pump 512 and cooling fans of fan modules 531 based on the optimal pump speed and fan speeds.

As an example, based on the optimal pump speed, RMC 522 communicates with a pump controller of CDU 501 to control the speed of liquid pump 512, which in turn controls a liquid flow rate of cooling liquid supplied to the liquid manifold 525 to be distributed to at least some of server blades 503. Therefore, the operating condition and the corresponding cooling device performance are adjusted. Similarly, based on the optimal fan speeds, RMC 522 communicates with each of the fan modules 531 to control the speed of each cooling fan of the fan modules 531, which in turn control the airflow rates of the fan modules 531. Note that each of fan modules 531 may be individually controlled with its specific optimal fan speed, and different fan modules and/or different cooling fans within the same fan module may have different optimal fan speeds.

Note that some or all of the IT equipment 503 (e.g., 503A, 503B, and/or 503C) may utilize different cooling methods. For instance, one server may utilize air cooling while another server may utilize liquid cooling. Alternatively, one IT component of a server may utilize air cooling while another IT component of the same server may utilize liquid cooling.

As previously explained, an embodiment of the disclosure may be (or include) a non-transitory machine-readable medium (such as microelectronic memory) having stored thereon instructions, which program one or more data processing components (generically referred to here as a "processor") to perform control operations, such as adjusting an open/closed configuration of one or more switches of the converter module, as described herein. In other embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery management system, comprising:
   a battery backup unit (BBU) shelf with a set of bus connectors;
   a battery module arranged to have a set of battery cell packages, each cell package comprising one or more battery cells; and
   a converter module having
      a set of converters that are each configured to regulate and output power to one or more bus connectors of the set of bus connectors,
      a first busbar to which an input of each converter is connected, the first busbar comprises a first plurality of switches, each switch of the first plurality of switches is disposed between adjacently connected converters, wherein when a first converter switch disposed between a first converter and a second converter is on, current flows between the first converter and the second converter through the first converter switch,
      a second busbar to which the input of each converter is connected via a first switch and to which each cell package is connected via a second switch, the second busbar comprises a second plurality of switches, each switch of the second plurality of switches is disposed between adjacently connected converters, cell packages, or a combination thereof, and
      a third busbar to which an output of each converter is connected and to which each bus connector is connected via a third switch, the third busbar comprises a third plurality of switches, each switch of the third plurality of switches is disposed between adjacently connected converters, bus connectors, or a combination thereof.

2. The battery management system of claim 1 further comprising a controller that is configured to control each of the switches of the converter module such that each converter draws power from one or more cell packages and each converter provides the output power to the one or more bus connectors.

3. The battery management system of claim 1, wherein the BBU shelf comprises a container, wherein the converter module and the battery module are removably housed within the container of the BBU shelf.

4. The battery management system of claim 3, wherein the battery module is designed to slide into and out of the container of the BBU shelf via an opening of the container.

5. The battery management system of claim 1, wherein the battery module comprises a battery output connector and the converter module comprises an input connector, wherein the battery output connector is arranged to removably connect to the input connector, thereby connecting the cell packages to the second busbar.

6. The battery management system of claim 1, wherein the input of each converter is removably connected to a portion of the first busbar that is connected to a portion of the second busbar via the first switch and the output of each converter is removably connected to a portion of the third busbar, such that each converter may be individually removed from the converter module.

7. The battery management system of claim 1, wherein each switch comprises back-to-back N-channel metal-oxide-semiconductor field-effect transistors (MOSFETs).

8. A battery backup unit (BBU) shelf, comprising:
   a set of bus connectors;
   a battery module arranged to have a set of battery cell packages, each cell package comprising one or more battery cells; and
   a converter module having
      a set of converters that are each configured to regulate and output power to one or more of the bus connectors of the set of bus connectors,
      a first busbar to which an input of each converter is connected, the first busbar comprises a first plurality of switches, each switch of the first plurality of switches is disposed between adjacently connected converters, wherein when a first converter switch disposed between a first converter and a second converter is on, current flows between the first converter and the second converter through the first converter switch,
      a second busbar to which the input of each converter is connected via a first switch and to which each cell package is connected via a second switch, the second busbar comprises a second plurality of switches, each switch of the second plurality of switches is disposed between adjacently connected converters, cell packages, or a combination thereof, and
      a third busbar to which an output of each converter is connected and to which each bus connector is connected via a third switch, the third busbar comprises a third plurality of switches, each switch of the third plurality of switches is disposed between adjacently connected converters, bus connectors, or a combination thereof.

9. The BBU shelf of claim 8 further comprising a controller that is configured to control each of the switches of the converter module such that each converter draws power from one or more cell packages and each converter provides the output power to the one or more bus connectors.

10. The BBU shelf of claim 8 further comprising a container, wherein the converter module and the battery module are removably housed within the container of the BBU shelf.

11. The BBU shelf of claim 10, wherein the battery module is designed to slide into and out of the container of the BBU shelf via an opening of the container.

12. The BBU shelf of claim 8, wherein the battery module comprises a battery output connector and the converter module comprise an input connector, wherein the battery output connector is arranged to removably connect to the input connector, thereby connecting the cell packages to the second busbar.

13. The BBU shelf of claim 12, wherein the input of each converter is removably connected to a portion of the first busbar that is connected to a portion of the second busbar via the first switch and the output of each converter is removably connected to a portion of the third busbar, such that each converter may be individually removed from the converter module.

14. The BBU shelf of claim 8, wherein each switch comprises back-to-back N-channel metal-oxide-semiconductor field-effect transistors (MOSFETs).

15. An electronic rack, comprising:
   a plurality of pieces of Information Technology (IT) equipment, at least one of the pieces of IT equipment including one or more servers to provide data processing services;
   a power supply unit coupled to the plurality of pieces of IT equipment; and a battery backup unit (BBU) shelf to provide backup power to the pieces of IT equipment when the power supply unit is unavailable, wherein the BBU shelf includes
a set of bus connectors,
a battery module arranged to have a set of battery cell packages, each cell package comprising one or more battery cells, and
a converter module having
a set of converters that are each configured to regulate and output power to one or more of the bus connectors of the set of bus connectors,
a first busbar to which an input of each converter is connected, the first busbar comprises a first plurality of switches, each switch of the first plurality of switches is disposed between adjacently connected converters, wherein when a first converter switch disposed between a first converter and a second converter is on, current flows between the first converter and the second converter through the first converter switch,
a second busbar to which the input of each converter is connected via a first switch and to which each cell package is connected via a second switch, the second busbar comprises a second plurality of switches, each switch of the second plurality of switches is disposed between adjacently connected converters, cell packages, or a combination thereof, and
a third busbar to which an output of each converter is connected and to which each bus connector is connected via a third switch, the third busbar comprises a third plurality of switches, each switch of the third plurality of switches is disposed between adjacently connected converters, bus connectors, or a combination thereof.

16. The electronic rack of claim 15 further comprising a controller that is configured to control each of the switches of the converter module such that each converter draws power from one or more cell packages and each converter provides the output power to the one or more bus connectors.

17. The electronic rack of claim 15, wherein the BBU shelf comprises a container, wherein the converter module and the battery module are removably housed within the container of the BBU shelf.

18. The electronic rack of claim 17, wherein the battery module is designed to slide into and out of the container of the BBU shelf via an opening of the container.

19. The electronic rack of claim 15, wherein the battery module comprises a battery output connector and the converter module comprises an input connector, wherein the battery output connector is arranged to removably connect to the input connector, thereby connecting the cell packages to the second busbar.

20. The electronic rack of claim 15, wherein the input of each converter is removably connected to a portion of the first busbar that is connected to a portion of the second busbar via the first switch and the output of each converter is removably connected to a portion of the third busbar, such that each converter may be individually removed from the converter module.

21. The electronic rack of claim 15, wherein each switch comprises back-to-back N-channel metal-oxide-semiconductor field-effect transistors (MOSFETs).

* * * * *